(12) United States Patent
Kanamura et al.

(10) Patent No.: US 10,096,809 B2
(45) Date of Patent: Oct. 9, 2018

(54) METHOD FOR MANUFACTURING SECONDARY BATTERY SEPARATOR AND METHOD FOR MANUFACTURING LITHIUM SECONDARY BATTERY

(71) Applicants: TOKYO METROPOLITAN UNIVERSITY, Tokyo (JP); 3DOM INC., Sagamihara (JP); TOKYO OHKA KOGYO CO., LTD., Kawasaki (JP)

(72) Inventors: Kiyoshi Kanamura, Tokyo (JP); Hirokazu Munakata, Tokyo (JP); Kazuhiro Imazawa, Kanagawa (JP); Hiroyoshi Sago, Kanagawa (JP)

(73) Assignees: TOKYO METROPOLITAN UNIVERSITY, Tokyo (JP); 3DOM INC., Sagamihara (JP); TOKYO OHKA KOGYO CO., LTD., Kawasaki (JP)

( * ) Notice: Subject to any disclaimer, the term of this patent is extended or adjusted under 35 U.S.C. 154(b) by 281 days.

(21) Appl. No.: 14/895,389

(22) PCT Filed: Jun. 4, 2014

(86) PCT No.: PCT/JP2014/065395
§ 371 (c)(1),
(2) Date: Dec. 2, 2015

(87) PCT Pub. No.: WO2014/196656
PCT Pub. Date: Dec. 11, 2014

(65) Prior Publication Data
US 2016/0111695 A1   Apr. 21, 2016

(30) Foreign Application Priority Data
Jun. 7, 2013   (JP) .................. 2013-120391

(51) Int. Cl.
*H01M 10/04*   (2006.01)
*H01M 2/14*   (2006.01)
(Continued)

(52) U.S. Cl.
CPC .......... *H01M 2/145* (2013.01); *H01M 2/166* (2013.01); *H01M 2/1653* (2013.01);
(Continued)

(58) Field of Classification Search
USPC ........................................... 29/623.1; 264/49
See application file for complete search history.

(56) References Cited

U.S. PATENT DOCUMENTS

| 9,647,255 B2 * | 5/2017 | Choi ................... H01M 2/1686 |
| 2014/0329130 A1 * | 11/2014 | Kanamura ............ H01M 2/145 429/144 |
| 2015/0357648 A1 * | 12/2015 | Sugimoto ............. H01M 4/139 429/217 |

FOREIGN PATENT DOCUMENTS

| JP | 2000-191823 | 7/2000 |
| JP | 2001-098106 | * 4/2001 |

(Continued)

OTHER PUBLICATIONS

Wang et al. Simple Method for Preparation of Polyimide Film with an Ordered Surface Based on in Situ Self-Assembly of Polyamic Acid and Silica Microspheres. (Langmuir, vol. 26(23), pp. 18357-18361 (2010)).*

(Continued)

*Primary Examiner* — Mark Kaucher
*Assistant Examiner* — Henry Hu

(57) ABSTRACT

A method for manufacturing, a secondary battery separator including a porous resin film in which pores have three-dimensionally ordered structure and are in mutual communication via through-holes. The method includes: uniformly (Continued)

dispersing spherical microparticles having narrow particle size distribution in a dispersion medium to prepare a microparticles-dispersed slurry; drying slurry to obtain a spherical microparticles-dispersed film; heat-treating the film to form a microparticles-resin film in which the microparticles are regularly arrayed in three-dimensions in a resin matrix; and contacting the microparticles-resin film with an organic acid, water, an alkaline solution or an inorganic acid other than hydrofluoric acid to dissolve and remove the microparticles, or heating the microparticles-resin film to remove the microparticles, to form pores which are in mutual communication and regularly arrayed in the resin matrix. The medium has a resin precursor for the resin matrix and surfaces of the microparticles are inactive against the medium.

16 Claims, 11 Drawing Sheets

(51) Int. Cl.
    *H01M 2/16*      (2006.01)
    *H01M 2/18*      (2006.01)
    *H01M 10/052*    (2010.01)

(52) U.S. Cl.
    CPC ........... *H01M 2/1686* (2013.01); *H01M 2/18* (2013.01); *H01M 10/04* (2013.01); *H01M 10/052* (2013.01)

(56) References Cited

FOREIGN PATENT DOCUMENTS

| | | | |
|---|---|---|---|
| JP | 2001-98106 | | 4/2001 |
| JP | 2010-24385 | | 2/2010 |
| JP | 2011-060539 | * | 3/2011 |
| JP | 2011-60539 | | 3/2011 |
| JP | 2012-107144 | | 6/2012 |
| JP | 2012-108309 | | 6/2012 |

OTHER PUBLICATIONS

International Search Report dated Aug. 19, 2014, in corresponding International Application No. PCT/JP2014/065395.

* cited by examiner

Cathode: LiCoO$_2$ / AB / PVdF = 92 / 4 / 4 (wt.%)
(φ14, thickness = 31.6 μm, 1.672 mA h)
Anode: Li - Cu
(φ14, Li : 20 μm  Cu : 10 μm, 6.34 mA h)
Cut off voltage: 2.0 – 4.3 V
Charge rate: CC - CV at 0.1 C – 4.3 V to 0.01 C (0.11 mA cm$^{-2}$)
Discharge rate: CC at 0.1 C
Temperature: 30 °C
Electrolyte: 1 mol dm$^{-3}$ LiPF$_6$ / EC (60 μL)

METHOD FOR MANUFACTURING SECONDARY BATTERY SEPARATOR AND METHOD FOR MANUFACTURING LITHIUM SECONDARY BATTERY

CROSS-REFERENCE TO RELATED APPLICATIONS

This application is a U.S. National Stage Application, which claims the benefit under 35 U.S.C. 371 of PCT International Application No. PCT/JP2014/065395, filed Jun. 4, 2014, which claims the foreign priority benefit under 35 U.S.C. 119 of Japanese Patent Application No. 2013-120391, filed on Jun. 7, 2013, the contents of which are incorporated herein by reference.

TECHNICAL FIELD

The present invention relates to a method for manufacturing a secondary battery separator. In particular, the present invention relates to a method for manufacturing a secondary battery separator including a porous heat-resistant resin film having three-dimensionally ordered pores wherein a plurality of pores are regularly arrayed in three-dimensions.

BACKGROUND ART

The present inventors have proposed a secondary battery separator as a lithium secondary battery separator. The secondary battery separator includes a porous resin film which has a porosity of 60% or more, and has pores regularly arrayed in three-dimensions and being in mutual communication via through-holes (three-dimensionally ordered pores) (Patent Literature 1).

In a manufacturing method described in Patent Literature 1, monodisperse spherical silica particles having a particle size of 50 to 2500 nm are dispersed in a solvent. By filtering the dispersion liquid with a filter, the monodisperse spherical silica particles are accumulated on the filter, to form a close-packed structure. Spaces among the silica particles of a sintered body obtained by firing the deposit are filled with a resin. The sintered body is then immersed in a hydrofluoric acid solution, to dissolve and remove the silica particles, thereby forming through-holes. Since the monodisperse spherical silica particles have a uniform particle size, the monodisperse spherical silica particles are closely packed easily, and the through-holes formed after the silica particles are dissolved and removed also have the same size. However, the hydrofluoric acid solution is required in order to dissolve and remove the silica particles. The hydrofluoric acid solution is hard to handle, which disadvantageously causes a high manufacturing cost.

There has been also proposed a method of manufacturing a secondary battery separator comprising steps of forming a varnish from polyamic acid or polyimide, silica particles, and a solvent on a substrate, and imidizing the varnish to obtain a polyimide-silica composite film, and dissolving and removing silica using hydrogen fluoride water from the polyimide-silica composite film (Patent Literature 2). However, the method of Patent Literature 2 also uses the hydrofluoric acid solution, which causes a handling and cost problems as in Patent Literature 1.

CITATION LIST

Patent Literature

[Patent Literature 1] Japanese Patent Application Laid-Open No. 2011-60539

[Patent Literature 2] Japanese Patent Application Laid-Open No. 2012-107144

SUMMARY OF INVENTION

Technical Problem

The hydrofluoric acid used for the manufacturing method described in Patent Literature 1 is not easily handled, which causes an increase in a manufacturing cost. This requires a method using no hydrofluoric acid It is an object of the present invention to provide a method for manufacturing, without using hydrofluoric acid, a secondary battery separator including a porous resin film in which pores are regularly arrayed in three-dimensions and are in mutual communication via through-holes (three-dimensionally ordered pores).

Solution to Problem

The present invention provides a method for manufacturing a secondary battery separator, the method having the following steps, and a method for manufacturing a secondary battery.

[1] A method for manufacturing a secondary battery separator comprising a porous resin film in which pores are regularly arrayed in three-dimensions and are in mutual communication via through-holes, the method comprising: a slurry preparation step of uniformly dispersing spherical microparticles having narrow particle size distribution in a dispersion medium to prepare a microparticles-dispersed slurry; a film preparation step of drying the microparticles-dispersed slurry to obtain a spherical microparticles-dispersed film; a resin-film preparation step of heat-treating the spherical microparticles-dispersed film to form a microparticles-resin film in which the microparticles are regularly arrayed in three-dimensions in a resin matrix; and a porous resin film forming step of contacting the microparticles-resin film with an organic acid, water, an alkaline solution or an inorganic acid other than hydrofluoric acid to dissolve and remove the microparticles, or heating the microparticles-resin film to remove the microparticles, to form pores which are in mutual communication via through-holes and regularly arrayed in three-dimensions in the resin matrix, wherein: the dispersion medium comprises a resin precursor which constitutes the resin matrix; and the surfaces of the spherical microparticles are inactive against the dispersion medium.

[2] The method according to [1], further comprising a step of inactivating the surfaces of the spherical microparticles against the dispersion medium.

[3] The method according to [1] or [2], wherein the spherical microparticles have a median diameter of 50 nm to 3000 nm and a particle size distribution coefficient of variation of 0 to 70%.

[4] The method according to any one of [1] to [3], wherein the spherical microparticles are selected from calcium carbonate, calcium oxide, titanium dioxide, zinc oxide, cerium oxide, polymethyl methacrylate, polystyrene, or a complex of silica particles, titania particles or ceria particles and carboxymethyl cellulose or polymethyl methacrylate.

[5] The method according to any one of [2] to [4], wherein the step of inactivating the spherical microparticle surface includes dispersing the spherical microparticles in an aprotic polar solvent.

[6] The method according to [5], wherein the aprotic polar solvent is selected from N-methyl-2-pyrolidone, dimethylformamide, tetramethylurea, and hexamethylphosphoric triamide.

[7] The method according to any one of [2] to [4], wherein the step of inactivating includes modifying the surfaces of the spherical microparticles with silicon oxide, titanium oxide, aluminum oxide, zinc oxide, tetraethoxysilane, oxalic acid, citric acid, or lactic acid.

[8] The method according to any one of [1] to [7], wherein the inorganic acid is selected from hydrochloric acid, sulfuric acid, nitric acid, perchloric acid, phosphoric acid, and boric acid.

[9] The method according to any one of [1] to [8], wherein the organic acid is selected from citric acid, acetic acid, formic acid, oxalic acid, lactic acid, and gluconic acid.

[10] The method according to any one of [1] to [9], wherein the alkaline solution is selected from sodium hydroxide, potassium hydroxide, sodium carbonate, potassium carbonate, ammonia, hydroxylamine, ethanol amine, ethylene diamine, phenol, p-cresol, m-cresol, o-cresol, hydroquinone, resorcinol, catechol, and phloroglucinol.

[11] The method according to any one of [1] to [10], wherein: the resin matrix is polyimide; and the dispersion medium is polyamic acid.

[12] The method according to any one of [1] to [11], wherein, in the film preparation step, a base selected from polypropylene, aramid, cellulose, and polytetrafluoroethylene is coated with the microparticle dispersed slurry, followed by being dried, to obtain a spherical microparticles-dispersed film having a two-layer structure.

[13] The method according to any one of [1] to [11], wherein, in the film preparation step, a film formation substrate is coated with the microparticles-dispersed slurry, followed by being dried to obtain a film, and the obtained film is thereafter peeled to obtain a spherical microparticles-dispersed film having a one-layer structure.

[14] A method for manufacturing a lithium secondary battery, the method comprising positioning the secondary battery separator obtained by the method according to any one of [1] to [13] between a cathode and an anode.

In the present invention and the present specification, the "three-dimensionally ordered structure" means a structure where the pores are regularly arrayed in three-dimensions, i.e., the pores which are three-dimensionally adjacent to each other are aligned in mutual communication in the whole porous resin film according to the present invention. For example, the "three-dimensionally ordered structure" means a structure where the pores which are three-dimensionally adjacent to each other are aligned in mutual communication in the porous resin film having a porosity of 70% or more and 90% or less.

Advantageous Effects of Invention

The present invention can safely manufacture a secondary battery separator including a porous resin film in which pores have a three-dimensionally ordered structure and are in mutual communication via through-holes, at low cost without using hydrofluoric acid.

DESCRIPTION OF EMBODIMENTS

Hereinafter, the present invention will be described with reference to the accompanying drawings, but the present invention is not limited thereto. In the present application specification and claims, the term "narrow disperse" means that the particle size distribution of microparticles denoted by a coefficient of variation (standard deviation of particle size distribution/average value×100) is narrow. Generally, in many cases, the term "monodisperse" means a case where a coefficient of variation is about 10% or less. In the present invention, a case where a coefficient of variation is 0 to 70% is referred to as "narrow disperse".

Figure 1:
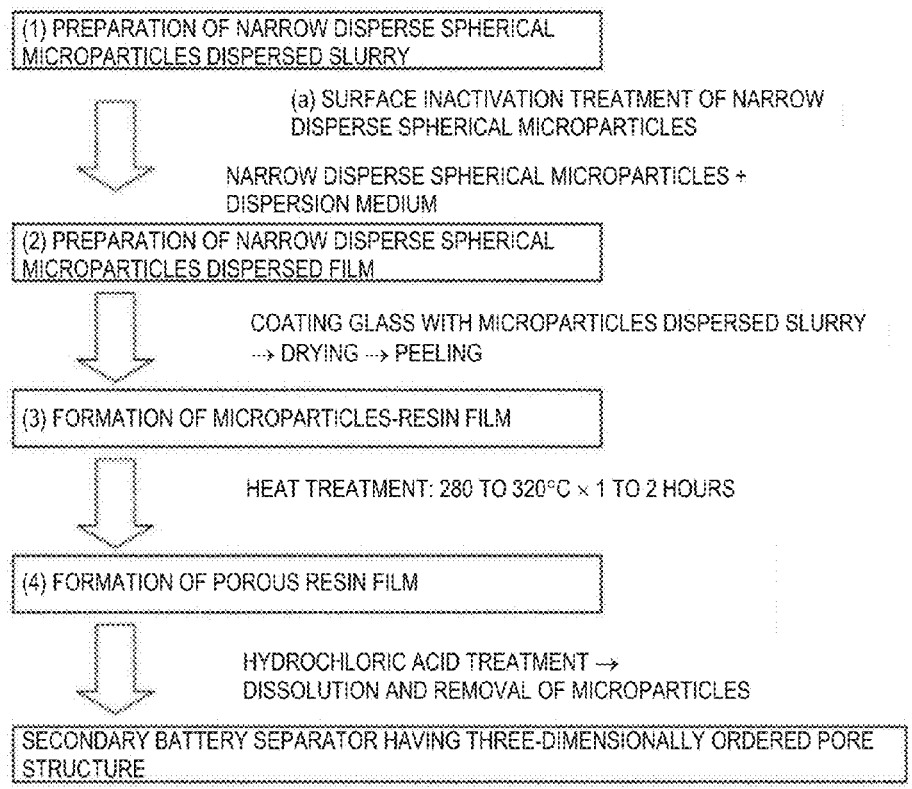
FIG. 1 is a flow chart showing an example of a manufacturing method of the present invention.

An example of a flow chart of a manufacturing method of the present invention is shown in FIG. 1.

The present invention is a method for manufacturing a secondary battery separator including a porous resin film in which pores have a three-dimensionally ordered structure and are in mutual communication via through-holes. The method comprises the following steps.

(1) Narrow Disperse Spherical Microparticles-Dispersed Slurry Preparing Step

Narrow disperse spherical microparticles having narrow particle size distribution are uniformly dispersed in a dispersion medium to prepare a microparticles-dispersed slurry. The dispersion medium is a resin precursor which constitutes a porous resin film. The porous resin film may be a resin film usually used for the secondary battery separator. The dispersion medium may be appropriately selected according to the resin film. For example, when the porous resin film is a polyimide film, the dispersion medium is suitably polyamic acid.

The narrow disperse spherical microparticles have a uniform particle size. The narrow disperse spherical microparticles have a median diameter of 50 nm to 3000 nm, and more preferably 100 nm to 1000 nm, and a particle size distribution coefficient of variation of 0 to 70%. The narrow disperse spherical microparticles are preferably inactive against the dispersion medium. Suitable examples of the narrow disperse spherical microparticles may include calcium carbonate, calcium oxide, titanium dioxide, zinc oxide, polymethyl methacrylate, polystyrene, polymethacrylic acid, cerium oxide, and a complex of nano inorganic particles and polymer. Examples of the complex of nano inorganic particles and polymer may include a complex of silica particles, titania particles or ceria particles and carboxymethyl cellulose or polymethyl methacrylate.

When the narrow disperse spherical microparticles are not inactive against the dispersion medium, the surfaces of the narrow disperse spherical microparticles are subjected to an inactivation treatment in the present step. The inactivation treatment can be performed by (a1) uniformly dispersing the narrow disperse spherical microparticles in an aprotic polar solvent, and (a2) coating the surfaces of the narrow disperse spherical microparticles with silicon oxide, titanium oxide, aluminum oxide, zinc oxide, tetraethoxysilane, oxalic acid, citric acid, and lactic acid, to modify the surfaces as a core/shell structure. Alternatively, the inactivation treatment can be performed by the combination of both (a1) and (a2).

N-methyl-2-pyrolidone, dimethylformamide, tetramethylurea, and hexamethylphosphoric triamide can be suitably used as the aprotic polar solvent. The aprotic polar solvent is desirably selected in consideration of an interaction with the dispersion medium used in order to prepare the narrow disperse spherical microparticles and the microparticle dispersed slurry. For example, when calcium carbonate is used as the narrow disperse spherical microparticles, and polyamic acid is used as the dispersion medium, N-methyl-2-pyrolidone is suitably used as the aprotic polar solvent.

The surfaces of the narrow disperse spherical microparticles can be modified by using a method for dispersing the narrow disperse spherical microparticles in a solvent dissolving a substance modifying the surfaces of the narrow disperse spherical microparticles without dissolving the narrow disperse spherical microparticles, to obtain a dispersion liquid, and holding the dispersion liquid at a predetermined temperature, or a sol gel method. Suitable examples of the solvent in the modification using the solvent may include alcohol. For example, calcium carbonate and oxalic acid are dispersed in ethanol to obtain a dispersion liquid, and the dispersion liquid is held at normal temperature for 2 hours. Thereby, oxalic acid adsorbs to the surface of calcium carbonate ($CaCO_3$ and a carboxyl group: —COOH react with each other). In the sol gel method for modifying the surfaces with the silica particles, for example, calcium carbonate, alcohol, an ammonia aqueous solution, and tetraethoxysilane are mixed to introduce an —O—Si group generated by hydrolysis to the surface of calcium carbonate.

(2) Narrow Disperse Spherical Microparticles-Dispersed Film Preparing Step (2-1) Preparation of Film Having One-Layer Structure A film formation substrate is coated with the obtained microparticles-dispersed slurry, followed by being dried to form a film. The obtained film is peeled, to obtain a film having a one-layer structure. A substrate which is inactive against the microparticles-dispersed slurry and has a flat surface capable of being easily peeled after being dried can be used without limitation as the film formation substrate. For example, a glass plate, a polymer sheet made of polyethylene terephthalate or the like, and a metal sheet made of stainless steel or the like are suitable. A normal coating method can be used without limitation in order to coat the film formation substrate with the microparticles-dispersed slurry. A doctor blade method, a spraying method, and an injection method can be particularly suitably used. A coating thickness can be adjusted according to the thickness of a desired separator. For example, it is desirable that the coating thickness is 5 to 100 μm, and preferably 10 to 90 μm.

(2-2) Preparation of Film Having Two-Layer Structure

A base selected from polypropylene, aramid, cellulose, and polytetrafluoroethylene is coated with the obtained microparticles-dispersed slurry, followed by being dried to obtain a narrow disperse spherical microparticles-dispersed film having a two-layer structure. A normal coating method can be used without limitation in order to coat the base with the microparticles-dispersed slurry. A doctor blade method, a spraying method, and an injection method can be particularly suitably used. A coating thickness can be adjusted according to the thickness of a desired separator. For example, it is desirable that the coating thickness is 5 to 100 μm, and preferably 10 to 90 μm.

(3) Microparticles-Resin Film Forming Step

The obtained narrow disperse spherical microparticles-dispersed film is heat-treated to form a microparticles-resin film in which the microparticles are regularly arrayed in three-dimensions, i.e., three-dimensionally ordered in a resin matrix. The dispersion medium is changed to a resin which constitutes the resin film by the heat treatment. Since a heat treatment condition has an influence on the physical properties of the resin film, the heat treatment is preferably performed under a suitable heat treatment condition. For example, when the dispersion medium is polyamic acid, polyimide is provided by a thermal imidization reaction. When polyamic acid is thermally imidized, it is preferable that the polyamic acid is heated at a temperature raising rate of 10° C./minute from room temperature, and then heated at a temperature of 280° C. to 320° C. for 1 hour to 2 hours. It is more preferable that the polyamic acid is heated at 280° C. for 1 hour, and then heated at 320° C. for 1 hour.

Particularly, when the narrow disperse spherical microparticles are removed by heating in a subsequent porous resin film forming step, it is sufficient to set a heating temperature in the microparticles-resin film forming step to a temperature lower than the heat decomposition temperature of the narrow disperse spherical microparticles. For example, the imidization is preferably performed at 180 to 320° C., and more preferably 180 to 250° C.

(4) Porous Resin Film Forming Step (4-1) Dissolution and Removal

The obtained microparticle-resin film is contacted with water, an alkaline solution, an organic acid, or an inorganic acid other than hydrofluoric acid to dissolve and remove the microparticles, to form pores which are in mutual communication via through-holes and have a three-dimensionally ordered structure in the resin matrix. It is sufficient for the inorganic acid, the organic acid, the alkaline solution, or the water to dissolve and remove the microparticles uniformly dispersed in the resin matrix without dissolving the resin matrix. The inorganic acid, the organic acid, the alkaline solution, or the water may be appropriately selected according to the solubility of the resin matrix and microparticles. For example, when the resin matrix is polyimide, and the microparticles are calcium carbonate, hydrochloric acid or citric acid is suitable. When the microparticles are titanium oxide, zinc oxide, and aluminum oxide, or surface-modified by these oxides, sodium hydroxide or sodium carbonate is suitable. For example, hydrochloric acid, sulfuric acid, nitric acid, perchloric acid, phosphoric acid, boric acid, water, sodium hydroxide, potassium hydroxide, sodium carbonate, potassium carbonate, ammonia, amines, and a phenol derivative are suitable, which are desirably easily handled and obtained. Suitable examples of the amines and phenol derivative are as follows.

amines

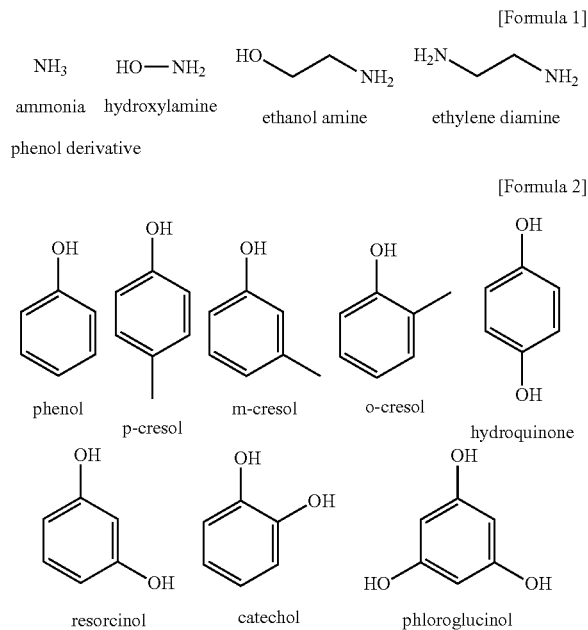

[Formula 1]

NH₃    HO—NH₂ ammonia   hydroxylamine   ethanol amine   ethylene diamine phenol derivative

[Formula 2]

phenol   p-cresol   m-cresol   o-cresol   hydroquinone resorcinol   catechol   phloroglucinol (4-2) Removal by Heating The microparticles are removed by heating the microparticles-resin film, and thereby the pores which are in mutual communication via through-holes and have a three-dimensionally ordered structure can also be formed in the resin matrix. When both the resin matrix and the microparticles are dissolved in the same substance, which makes it unsuitable to use a dissolution removing method, or when the heat decomposition and melting temperatures of the microparticles are higher than a heat treatment temperature for forming the microparticles-resin film, and lower than a temperature for attracting the deterioration of the resin film, the microparticles are removed by decomposing and melting the microparticles by heating. The microparticles which are suitably removed by heating are polymethyl methacrylate and polystyrene. The microparticles are decomposed to a monomer, a low-molecular weight substance, or $CO_2$ during heating, to disappear from the resin film (polyimide film). The heat decomposition temperature of the microparticles to be removed by heating is preferably 200 to 320° C., and more preferably 230 to 260° C. A too low temperature causes complicated condition setting of an imidization reaction. A too high temperature is apt to cause the heat deterioration of the resin film (polyimide film) by a heating removing treatment. The microparticles are preferably held at a temperature slightly higher than the selected heat decomposition temperature of the microparticles, for example, at 230 to 350° C. for a given length of time, as a heating condition.

When the removal by heating is performed, the heat treatment in the microparticles-resin film forming step for forming the microparticles-resin film in which the microparticles are three-dimensionally ordered in the resin matrix, and the removal by heating in the porous resin film forming step for removing the microparticles from the resin film to form the porous resin film may be performed in the same step. In this case, it is preferable that the heat treatment in the microparticle-resin film forming step is performed while a temperature is gradually raised (for example, a temperature raising rate of 5 to 20° C./minute), to reach the heat treatment temperature in the porous film resin forming step.

[Manufacturing Example by Surface Inactivation Treatment Using Aprotic Polar Solvent]

Figure 2:
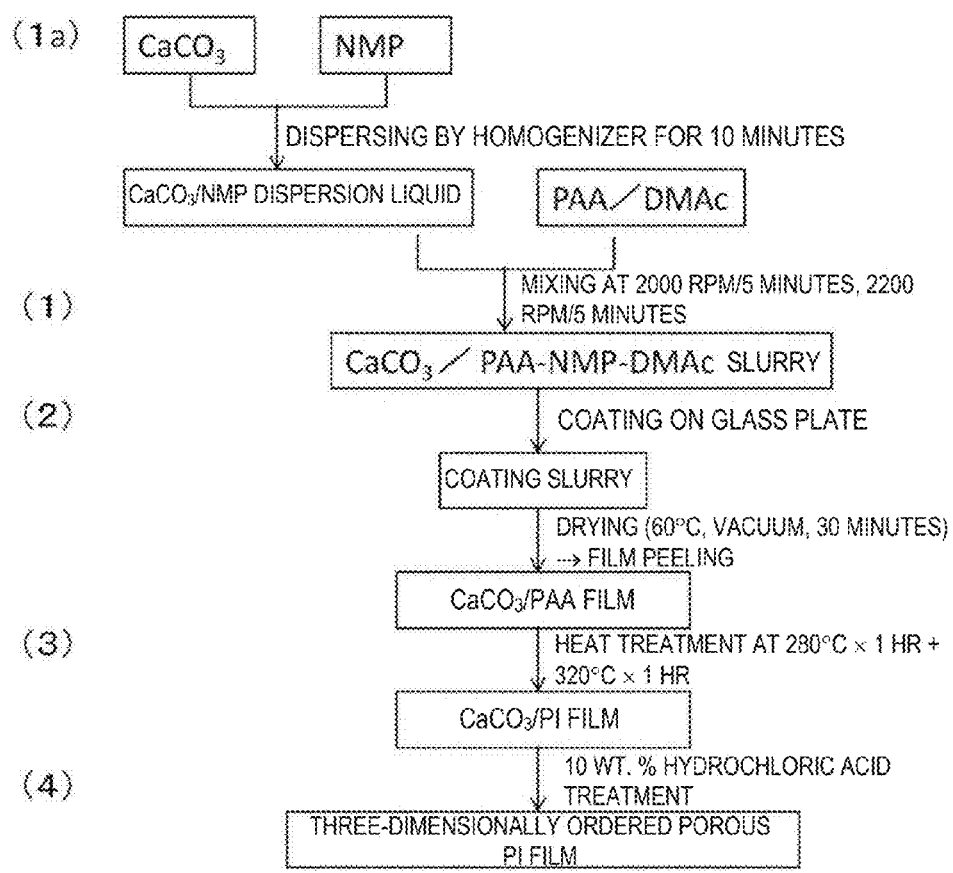
FIG. 2 is a flow chart showing manufacturing steps of a porous heat-resistant polyimide secondary battery separator.

In FIG. 2, the manufacturing method of the present invention will be schematically described as a manufacturing example of a porous heat-resistant polyimide secondary battery separator. In the manufacturing method, there are used calcium carbonate as narrow disperse spherical microparticles, N-methyl-2-pyrrolidone as an aprotic polar solvent for subjecting the narrow disperse spherical microparticles to an inactivation treatment, polyamic acid as a dispersion medium, and dimethylacetamide as a solvent for the polyamic acid.

(1) Narrow Disperse Spherical Microparticles-Dispersed Slurry Preparing Step

First, calcium carbonate particles ($CaCO_3$) are uniformly dispersed in N-methyl-2-pyrrolidone (NMP) to inactivate the surfaces of the calcium carbonate particles. The polyamic acid (PAA) is dissolved in dimethylacetamide (DMAc), to prepare a dispersion solvent. The calcium carbonate particles are mixed with the dispersion solvent to prepare a calcium carbonate dispersed slurry ($CaCO_3$/PAA-NMP-DMAc slurry).

(2) Narrow Disperse Spherical Microparticles-Dispersed Film Preparing Step

The glass plate is coated with the calcium carbonate dispersed slurry ($CaCO_3$/PAA-NMP-DMAc slurry), followed by being dried under vacuum at 60° C. for 30 minutes to peel a film ($CaCO_3$/PAA film).

(3) Microparticles-Resin Film Forming Step

The film ($CaCO_3$/PAA film) is heated at a temperature raising rate of 10° C./minute to 280° C. from room temperature, and heat-treated at 280° C. for 1 hour. The film is then heated to 320° C. at a temperature raising rate of 10° C./minute, and heat-treated at 320° C. for 1 hour to subject the polyamic acid to a thermal imidization reaction, thereby forming a microparticle-resin film ($CaCO_3$/PI film).

(4) Porous Resin Film Forming Step

The microparticles-resin film ($CaCO_3$/PI film) is treated with 10 wt. % hydrochloric acid, to dissolve and remove the calcium carbonate particles, and thereby a three-dimensionally ordered porous polyimide film (PI film) is formed. In the porous polyimide film, pores having the same size are in mutual communication via through-holes and are regularly arrayed in three-dimensions i.e., three-dimensionally ordered, in the resin matrix (polyimide).

The three-dimensionally ordered pores of the porous resin film are formed by removing the microparticles contained in the microparticle dispersed slurry. Hence, the alignment of the microparticles in the microparticle dispersed slurry is important. The median diameter of the narrow disperse spherical microparticles is preferably within the range of 50 to 3000 nm, and more preferably 100 to 1000 nm. It is necessary for the microparticles contained in the microparticles-dispersed slurry to have a nearly identical particle size in order to form the three-dimensionally ordered pores of the porous resin film. The microparticles have a coefficient of variation of 0 to 70%, preferably 0 to 50%, and more preferably 0 to 10%. When the particle sizes differ greatly, ordered pores cannot be obtained. The pore size obtained after the removal of the microparticles is somewhat smaller than the average particle size of the microparticles used because of, for example, the shrinkage of the resin film. The average particle size of the microparticles can be determined based on the porosity and pore size which are finally required for the porous resin film, and the shrinkage ratio of the resin. For example, to achieve a porosity of 70% or more and 90% or less, it is preferable that the microparticles-resin film contains 70 to 80 vol. % of the microparticles.

The hexagonal close-packed, three-dimensionally ordered microparticles can be obtained by appropriately controlling the viscosity of the microparticles-dispersed slurry and the content of the microparticles. To obtain the hexagonal close-packed structure, it is desirable that the viscosity of the microparticle dispersed slurry is within the range of 10 to 3000 poise, preferably 50 to 2000 poise, and more preferably 100 to 1500 poise, and that the content of the microparticles is within the range of 1 to 50 vol. %, preferably 5 to 30 vol. %, and more preferably 10 to 20 vol. %.

When a secondary battery separator including a porous heat-resistant polyimide film is manufactured, a polyamic acid dispersion medium containing an acid anhydride component and a diamine component is preferably used as the microparticles-dispersed slurry.

The acid anhydride is not particularly limited, but may be, for example, an acid dianhydride. Preferable examples of the acid dianhydride may include ethylenetetracarboxylic dianhydride, butanetetracarboxylic dianhydride, cyclopentanetetracarboxylic dianhydride, cyclohexanetetracarboxylic dianhydride, 1,2,4,5-cyclohexanetetracarboxylic dianhydride, 1,2,3,4-cyclohexanetetracarboxylic dianhydride, pyromellitic dianhydride(1,2,4,5-benzenetetracarboxylic-1,2,4,5-dianhydride), 1,1-bis(2,3-dicarboxyphenyl)ethane dianhydride, bis(2,3-dicarboxyphenyl)methane dianhydride, bis(3,4-dicarboxyphenyl)methane dianhydride, 3,3',4,4'-biphenyltetracarboxylic dianhydride, 2,2,6,6-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, bis(3,4-dicarboxyphenyl)sulfone dianhydride, bis(3,4-dicarboxyphenyl)ether dianhydride, bis(2,3-dicarboxyphenyl)ether dianhydride, 3,3',4,4'-benzophenonetetracarboxylic dianhydride, 2,2',3,3'-benzophenonetetracarboxylic dianhydride, 4,4-(p-phenylenedioxy)diphthalic dianhydride, 4,4-(m-phenylenedioxy)diphthalic dianhydride, 1,2,5,6-naphthalenetetracarboxylic dianhydride, 1,4,5,8-naphthalenetetracarboxylic dianhydride, 2,3,6,7-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, and 9,9-bis(phthalic anhydride fluorine). These tetracarboxylic dianhydrides may be used singly or in combinations of two or more.

As the diamine, fatty diamines and aromatic diamines or the like may be used singly or in combination. A preferable fatty diamine may be, for example, a fatty diamine having about 2 to about 15 carbon atoms. Specific examples may include pentamethylene diamine, hexamethylene diamine, and heptamethylene diamine. A preferable aromatic diamine may be a diamino compound having one phenyl group or about 2 to about 10 phenyl groups attached. Specific examples may include phenylenediamines and derivatives thereof, diaminodiphenyl compounds and derivatives thereof, diaminotriphenyl compounds and derivatives thereof, diaminonaphthalenes and derivatives thereof, aminophenylaminoindans and derivatives thereof, diaminotetraphenyl compounds and derivatives thereof, diaminohexaphenyl compounds and derivatives thereof, and cardo-type fluorenediamine derivatives. The phenylenediamines are m-phenylenediamine and p-phenylenediamine or the like, and the phenylenediamine derivatives are diamines to which an alkyl group such as a methyl group or an ethyl group has been attached, for example, 2,4-triphenylenediamine. The diaminodiphenyl compounds are obtained by the linkage of two aminophenyl groups via another group. The linkage is ether linkage, sulfonyl linkage, thioether linkage, linkage of alkylene or its derivative group, imino linkage, azo linkage, phosphine oxide linkage, amide linkage, and ureylene linkage, or the like. The alkylene linkage is linkage of an alkylene having about 1 to about 6 carbon atoms, and its derivative group is an alkylene group whose one or more hydrogen atoms have been replaced by halogen atoms or the like. Examples of the diaminodiphenyl compounds may include 3,3'-diaminodiphenyl ether, 3,4'-diaminodiphenyl ether, 4,4'-diaminodiphenyl ether, 3,3'-diaminodiphenylsulfone, 3,4'-diaminodiphenylsulfone, 4,4'-diaminodiphenylsulfone, 3,3'-diaminodiphenylmethane, 3,4'-diaminodiphenylmethane, 4,4'-diaminodiphenylmethane, 4,4'-diaminodiphenyl sulfide, 3,3'-diaminodiphenyl ketone, 3,4'-diaminodiphenyl ketone, 2,2-bis(p-aminophenyl)propane, 2,2'-bis(p-aminophenyl)hexafluoropropane, 4-methyl-2,4-bis(p-aminophenyl)-1-pentene, 4-methyl-2,4-bis(p-aminophenyl)-2-pentene, iminodianiline, 4-methyl-2,4-bis(p-aminophenyl)pentane, bis(p-aminophenyl)phosphine oxide, 4,4'-diaminoazobenzene, 4,4'-diaminodiphenylurea, and 4,4'-diaminodiphenylamide. The diaminotriphenyl compounds are formed by linkage of two aminophenyl groups and one phenylene group, all of which are linked via another group. The "another group" is selected from the same groups as in the diaminodiphenyl compounds. Examples of the diaminotriphenyl compounds may include 1,3-bis(m-aminophenoxy)benzene, 1,3-bis(p-aminophenoxy)benzene, and 1,4-bis(p-aminophenoxy)benzene. Examples of the diaminonaphthalenes may include 1,5-diaminonaphthalene and 2,6-diaminonaphthalene. Examples of the aminophenylaminoindans include 5- or 6-amino-1-(p-aminophenyl)-1,3,3-trimethylindan. Examples of the diaminotetraphenyl compounds include 4,4'-bis(p-aminophenoxy)biphenyl, 2,2'-bis[p-(p'-aminophenoxy)phenyl]propane and 2,2'-bis[p-(p'-aminophenoxy)biphenyl]propane, and 2,2'-bis[p-(m-aminophenoxy)phenyl]benzophenone. Examples of the cardo-type fluorene derivatives may include 9,9-bis aniline fluorene. Other examples may include compounds obtained by replacement of the hydrogen atoms of these aromatic diamines by at least one substituent selected from the group consisting of a halogen atom, a methyl group, a methoxy group, a cyano group, and a phenyl group or the like.

The polyamic acid is a polymer of tetracarboxylic acid and diamine, and is a polyimide precursor obtained by equimolar polymerization of at least one each of the tetracarboxylic acid and the diamine.

The dispersion medium which constitutes the microparticles-dispersed slurry is not particularly limited unless it dissolves the microparticles. Preferable examples of the dispersion medium may include aprotic polar solvents such as N,N-dimethylformamide, N,N-dimethylacetamide and N-methyl-2-pyrrolidone; phenolic solvents such as cresols; and glycolic solvents such as diglyme. These dispersion media may be used singly or in combinations of two or more.

According to the manufacturing method of the present invention, there can be obtained a porous resin film in which pores have a three-dimensionally ordered structure and are in mutual communication via through-holes. A secondary battery can be manufactured by positioning the porous resin film as a secondary battery separator between a cathode and an anode according to an ordinary method for manufacturing a secondary battery.

The manufacturing method of the present invention can manufacture a polyimide film having a void ratio of 60 to 90% in terms of a volume ratio of calcium carbonate and a film thickness of 5 to 100 μm. The polyimide film obtained by the manufacturing method of the present invention can have an air permeability (air resistivity) based on JIS P 8117 for 20 to 1700 seconds and tensile strength of 0.4 to 35 MPa.

EXAMPLES

Example 1

A separator was prepared by using calcium carbonate subjected to a surface inactivation treatment as narrow disperse spherical microparticles (median diameter: 800 nm, coefficient of variation: 40%), and polyimide (polyamic acid as a dispersion medium) as a matrix resin according to a manufacturing method of the present invention shown in FIG. 2, and manufactured as follows.

Calcium carbonate was subjected to a surface inactivation treatment (NMP treatment) as follows.

3.6 g of calcium carbonate was added to 6 g of N-methyl-2-pyrolidone (NMP), and these were homogenized by a homogenizer for about 10 minutes, to prepare a calcium carbonate dispersion liquid.

Separately, polyamic acid was mixed with dimethylacetamide so that the concentration of polyamic acid was 18 to 20 wt. % in the total amount of 5 g, to prepare a polyamic acid/dimethylacetamide (PAA/DMAc) solution.

9.6 g of the calcium carbonate dispersion liquid and 5 g of the polyamic acid/dimethylacetamide solution were put into a stirring apparatus "AWATORIRENTARO" (manufactured by THINKY CORPORATION), mixed at 2000 rpm for 5 minutes, and then mixed at 2200 rpm for 5 minutes, to obtain a calcium carbonate/PAA-NMP-DMAc slurry containing 40 vol. % of calcium carbonate.

A glass plate was coated with the calcium carbonate/PAA-NMP-DMAc slurry, followed by being dried under vacuum at 60° C. for 30 minutes to obtain a calcium carbonate/PAA film. The obtained calcium carbonate/PAA film was peeled (a microparticles-resin film contained about 75 vol. % of microparticles).

The calcium carbonate/PAA film was heated at a temperature raising rate of 10° C./minute, heat-treated at 280° C. for 1 hour, and then heat-treated at 320° C. for 1 hour to thermally imidize polyamic acid, thereby obtaining a calcium carbonate/polyimide (PI) film.

The calcium carbonate/PI film was treated with 10 wt. % hydrochloric acid to dissolve and remove calcium carbonate, thereby obtaining a polyimide (PI) film.

Figure 3:
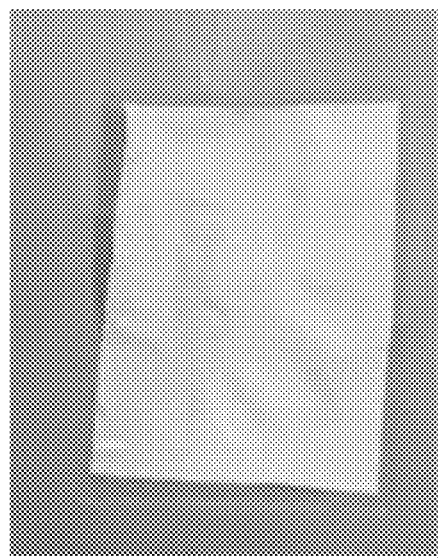
FIG. 3 is a photograph showing the appearance of a separator prepared in Example 1.
Figure 4:
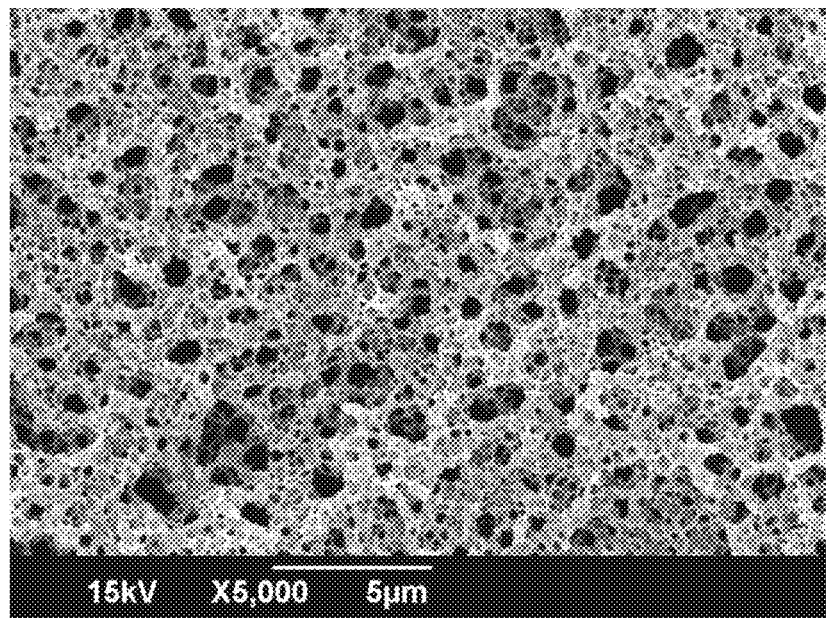
FIG. 4 is a SEM image of the separator prepared in Example 1.

As a result of determining whether cracks occurred in the obtained polyimide film, a separator having no crack was obtained (FIG. 3). In the obtained polyimide film, pores had a three-dimensionally ordered structure and were in mutual communication via through-holes (FIG. 4).

Example 2

A separator was prepared by using calcium carbonate subjected to a surface inactivation treatment as narrow disperse spherical microparticles (median diameter: 800 nm, coefficient of variation: 40%), and polyimide (polyamic acid as a dispersion medium) as a matrix resin according to a manufacturing method of the present invention shown in FIG. 2, and manufactured as follows.

Calcium carbonate was subjected to a surface inactivation treatment (silica modification) as follows.

10 g of calcium carbonate (median diameter: 800 nm, coefficient of variation: 40%) was dispersed in an ethanol aqueous solution (300 ml of ethanol+36 ml of distilled water). An ultrasonic wave was applied to the ethanol aqueous solution for 10 minutes to obtain a homogeneous dispersion liquid. Then, 30 ml of a 25% ammonia aqueous solution and 8 ml of triethoxysilane were added to the dispersion liquid, and these were stirred at room temperature for 2 hours to obtain a mixture. Then, the mixture was then centrifuged, and washed with ethanol to obtain $CaCO_3/SiO_2$ core/shell particles in which a one-molecule layer made of silicon oxide was fixed on the surface of calcium carbonate. The introduction amount of silicon oxide was 1 to 2 wt. %.

Then, 3.6 g of the obtained surface-modified microparticles were added to 6 g of N-methyl-2-pyrolidone, and these were homogenized by a homogenizer for about 10 minutes, to obtain a microparticle dispersion liquid.

Separately, polyamic acid was mixed with dimethylacetamide so that the concentration of polyamic acid was 18 to 20 wt. % in the total amount of 5 g, to prepare a polyamic acid/dimethylacetamide (PAA/DMAc) solution.

9.6 g of the microparticle dispersion liquid and 5 g of the polyamic acid/dimethylacetamide solution were put into a stirring apparatus "AWATORIRENTARO" (manufactured by THINKY CORPORATION), mixed at 2000 rpm for 5 minutes, and then mixed at 2200 rpm for 5 minutes, to obtain a microparticles-dispersed slurry containing 40 vol. % of microparticles.

A glass plate was coated with the obtained microparticle dispersed slurry, followed by being dried under vacuum at 60° C. for 30 minutes to obtain a film. The obtained calcium carbonate/PAA film was peeled (a microparticle-resin film contained about 75 vol. % of microparticles).

The calcium carbonate/PAA film was heated to 320° C. at a temperature raising rate of 10° C./minute, and heat-treated at 320° C. for 1 hour, to thermally imidize polyamic acid, thereby obtaining a calcium carbonate/polyimide (PI) film.

The calcium carbonate/PI film was treated with 10 wt. % hydrochloric acid to dissolve and remove calcium carbonate, thereby obtaining a polyimide (PI) film.

Figure 5:
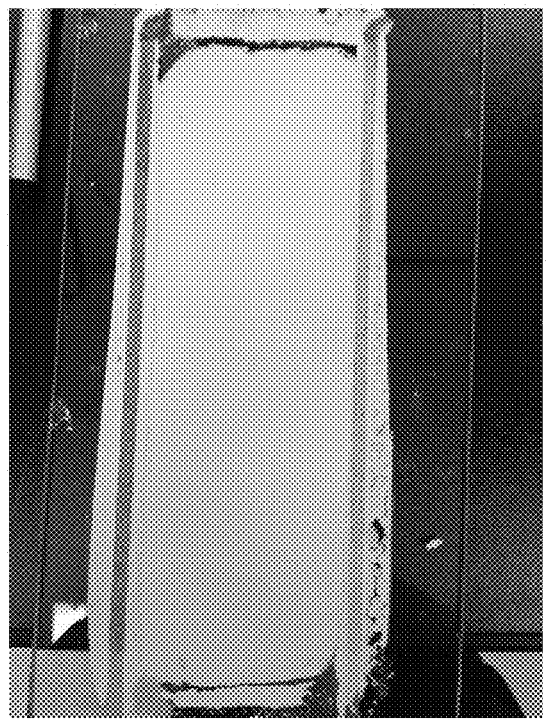
FIG. 5 is a photograph showing the appearance of a separator prepared in Example 2.

As a result of determining whether cracks occurred in the obtained polyimide film, a separator having no crack was obtained (FIG. 5). In the obtained polyimide film, pores had a three-dimensionally ordered structure and were in mutual communication via through-holes.

Example 3

A separator was prepared by using calcium carbonate subjected to a surface inactivation treatment as narrow disperse spherical microparticles (median diameter: 800 nm, coefficient of variation: 40%), and polyimide (polyamic acid as a dispersion medium) as a matrix resin according to a manufacturing method of the present invention shown in FIG. 2, and manufactured as follows.

Calcium carbonate was subjected to a surface inactivation treatment (oxalic acid modification) as follows.

10 g of calcium carbonate was added to 50 g of ethanol, and these were homogenized by a homogenizer for about 10 minutes while being cooled in ice water, to prepare a calcium carbonate/ethanol dispersion liquid.

Separately, 0.2 g of oxalic acid was dissolved in 23 g of ethanol, to prepare an oxalic acid/ethanol solution.

The calcium carbonate/ethanol dispersion liquid and the oxalic acid/ethanol solution were stirred at normal temperature for 2 hours, to obtain an oxalic acid-modified calcium carbonate slurry.

Figure 6:
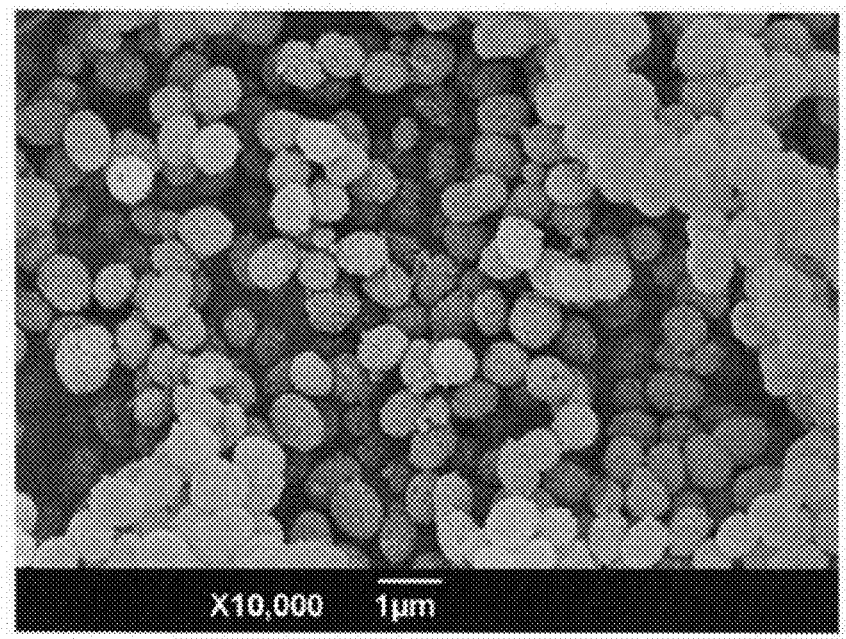
FIG. 6 is a SEM image of calcium carbonate subjected to an inactivation treatment in Example 3.

The oxalic acid-modified calcium carbonate/ethanol slurry was filtered under vacuum, and then washed to obtain an oxalic acid-modified calcium carbonate filtered product. The obtained oxalic acid-modified calcium carbonate filtered product was dried at 60° C. under vacuum, to obtain oxalic acid-modified calcium carbonate. The electron microscope (SEM) image of the obtained oxalic acid-modified calcium carbonate is shown in FIG. 6.

Then, 3.6 g of the obtained oxalic acid-modified microparticles were added to 6 g of N-methyl-2-pyrolidone, and these were homogenized by a homogenizer for about 10 minutes, to obtain a microparticle dispersion liquid.

Separately, polyamic acid was mixed with dimethylacetamide so that the concentration of polyamic acid was 18 to 20 wt. % in the total amount of 5 g, to prepare a polyamic acid/dimethylacetamide (PAA/DMAc) solution.

9.6 g of the microparticle dispersion liquid and 5 g of the polyamic acid/dimethylacetamide solution were put into "AWATORIRENTARO" (manufactured by THINKY CORPORATION), mixed at 2000 rpm for 5 minutes, and then mixed at 2200 rpm for 5 minutes, to obtain a microparticle dispersed slurry containing 40 vol. % of oxalic acid-modified calcium carbonate.

A glass plate was coated with the obtained microparticles-dispersed slurry, followed by being dried under vacuum at 60° C. for 30 minutes to obtain a film. The obtained calcium carbonate/PAA film was peeled (a microparticles-resin film contained about 75 vol. % of microparticles).

The calcium carbonate/PAA film was heated at a temperature raising rate of 10° C./minute, heat-treated at 280° C. for 1 hour, and then heat-treated at 320° C. for 1 hour, to thermally imidize polyamic acid, thereby obtaining a calcium carbonate/polyimide (PI) film.

The calcium carbonate/PI film was treated with 10 wt. % hydrochloric acid to dissolve and remove calcium carbonate, thereby obtaining a polyimide (PI) film.

Figure 7:
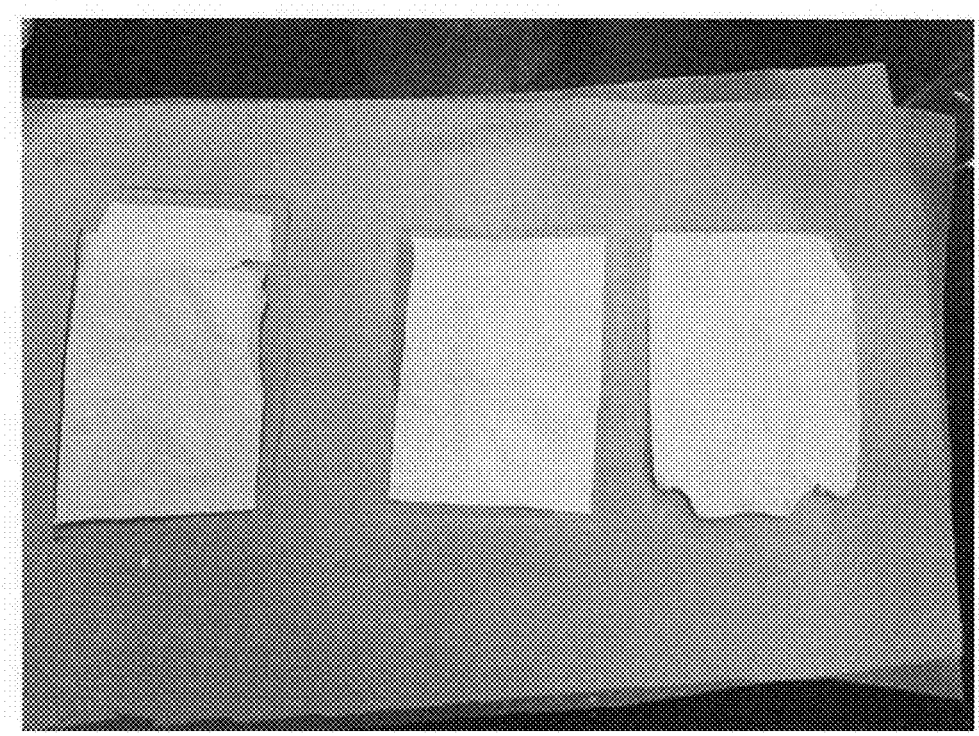
FIG. 7 is a photograph showing the appearance of a separator prepared in Example 3.
Figure 8:
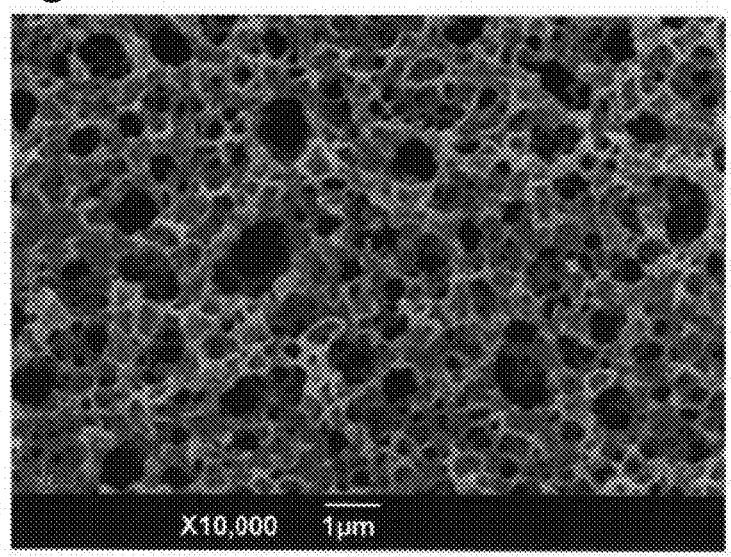
FIG. 8 is a SEM image of the separator prepared in Example 3.

As a result of determining whether cracks occurred in the obtained polyimide film, a separator having no crack was obtained (FIG. 7). In the obtained polyimide film, pores had a three-dimensionally ordered structure and were in mutual communication via through-holes (FIG. 8).

Example 4

A polyimide film was manufactured in the same manner as in Example 1 except that calcium carbonate was subjected to a surface inactivation treatment by using tetramethylurea (TMU) in place of NMP in (1a) in the manufacturing method shown in FIG. 2.

Figure 9:
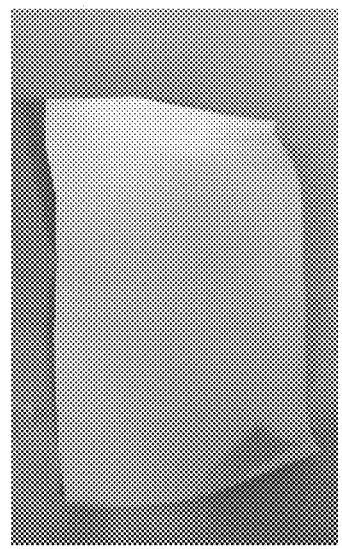
FIG. 9 is a photograph showing the appearance of a separator prepared in Example 4.
Figure 10:
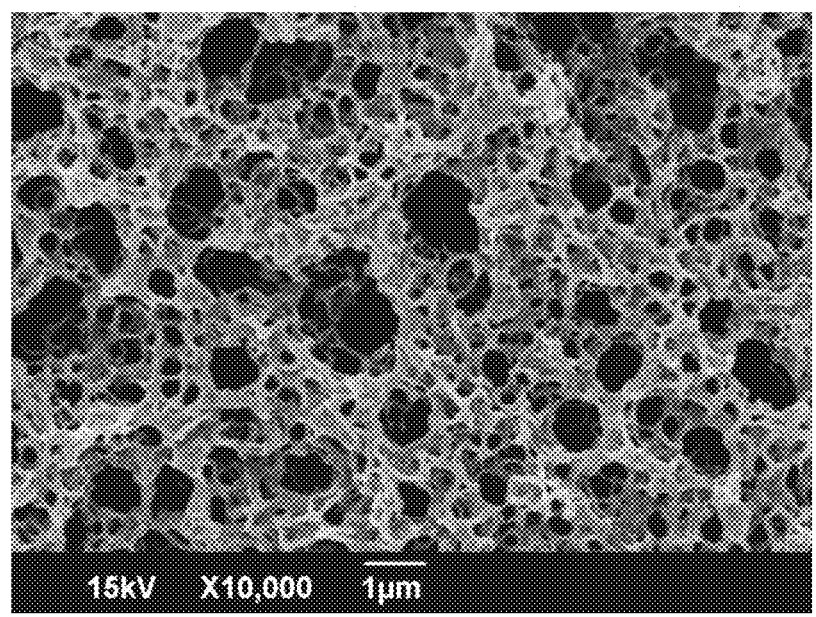
FIG. 10 is a SEM image of the separator prepared in Example 4.

As a result of determining whether cracks occurred in the obtained polyimide film, a separator having no crack was obtained (FIG. 9). In the obtained polyimide film, pores had a three-dimensionally ordered structure and were in mutual communication via through-holes (FIG. 10).

Example 5

A polyimide film was manufactured in the same manner as in Example 1 except that calcium carbonate was subjected to a surface inactivation treatment by using dimethylformamide (DEF) in place of NMP in (1a) in the manufacturing method shown in FIG. 2.

Figure 11:
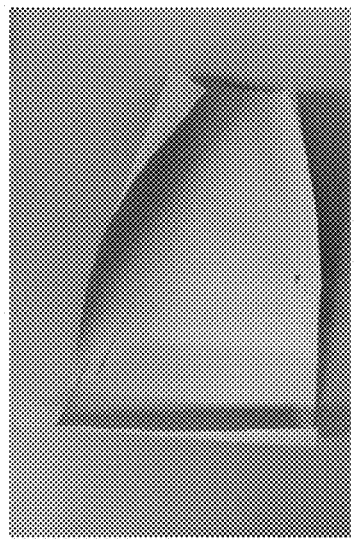
FIG. 11 is a photograph showing the appearance of a separator prepared in Example 5.
Figure 12:
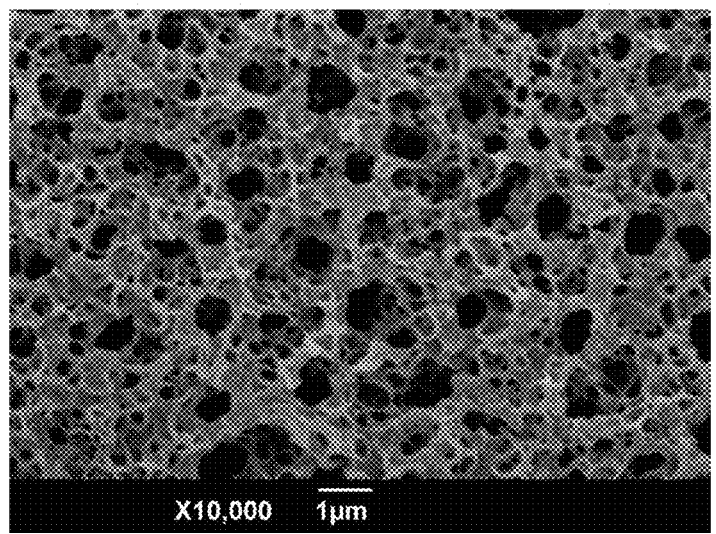
FIG. 12 is a SEM image of the separator prepared in Example 5.

As a result of determining whether cracks occurred in the obtained polyimide film, a separator having no crack was obtained (FIG. 11). In the obtained polyimide film, pores had a three-dimensionally ordered structure and were in mutual communication via through-holes (FIG. 12).

Example 6

A separator was prepared by using polymethyl methacrylate as narrow disperse spherical microparticles (median diameter: 800 nm, coefficient of variation: 40%), and polyimide (polyamic acid as a dispersion medium) as a matrix resin according to a manufacturing method of the present invention shown in FIG. 2, and manufactured as follows.

4.0 g of the polymethyl methacrylate microparticles were added to 12 g of ethanol, and these were stirred to prepare a polymethyl methacrylate dispersion liquid. 5.4 g of a polyamic acid/dimethylacetamide solution (PAA/DMAc) separately prepared and having a concentration of 12 to 13 wt. % and 6 g of the polymethyl methacrylate dispersion liquid were put into a stirring apparatus "AWATORIRENTARO" (manufactured by THINKY CORPORATION), and mixed and stirred at 2000 rpm for 10 minutes, to obtain a polymethyl methacrylate/PAA-ethanol DMAc slurry.

A glass plate was coated with the polymethyl methacrylate/PAA-ethanol DMAc slurry, followed by being dried at 60° C. for 30 minutes to obtain a polymethyl methacrylate/PAA film. The obtained polymethyl methacrylate/PAA film was peeled (a microparticles-resin film contained about 75 vol. % of microparticles).

The peeled polymethyl methacrylate/PAA film was heat-treated from room temperature to 320° C. at a temperature raising rate of 10° C./minute for a total of 2 hours. The imidization of PAA was promoted in the temperature raising process. While pores were formed at a temperature equal to or higher than the heat decomposition temperature (about 280° C.) of polymethyl methacrylate, perfect pores were formed at 320° C., and the imidization was completed to produce a polyimide film.

Figure 13:
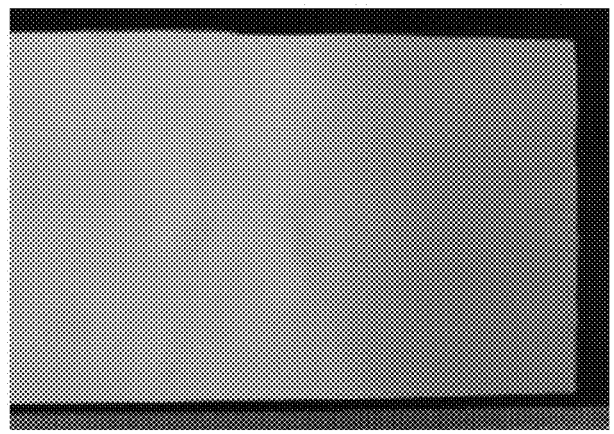
FIG. 13 is a photograph showing the appearance of a separator prepared in Example 6.
Figure 14:
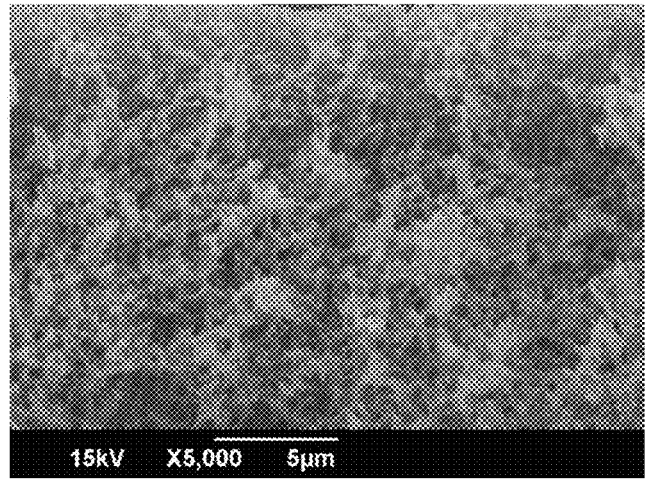
FIG. 14 is a SEM image of the separator prepared in Example 6.

As a result of determining whether cracks occurred in the obtained polyimide film, a separator having no crack was obtained (FIG. 13). In the obtained polyimide film, pores had a three-dimensionally ordered structure and were in mutual communication via through-holes (FIG. 14).

Example 7

Figure 15:
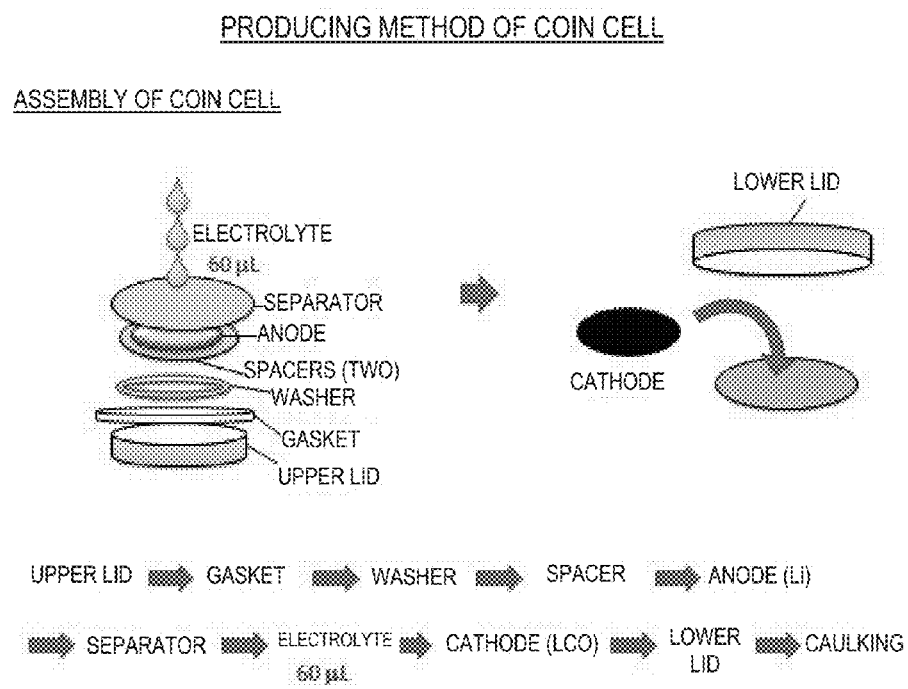
FIG. 15 is an exploded perspective view of a coin cell produced in Example 7.

A separator manufactured in Example 3 was interposed between a Li—Cu anode including Li as an anode active material and Cu as a collector and a $LiCoO_2$/AB/PVdF cathode including $LiCoO_2$ as a cathode active material, acetylene black as a conductive auxiliary agent, and polyvinylidene fluoride as a binder, to produce a coin cell (FIG. 15). 60 µL of an electrolyte (1 mol/dm$^3$ $LiPF_6$/ethylene carbonate) was dropped into the separator.

Figure 16:
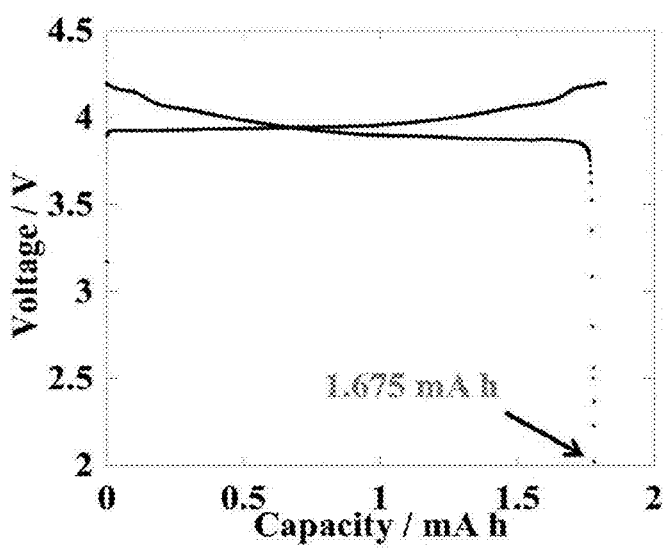
FIG. 16 is a voltage-current curve of the coin cell measured in Example 7.
Figure 17:
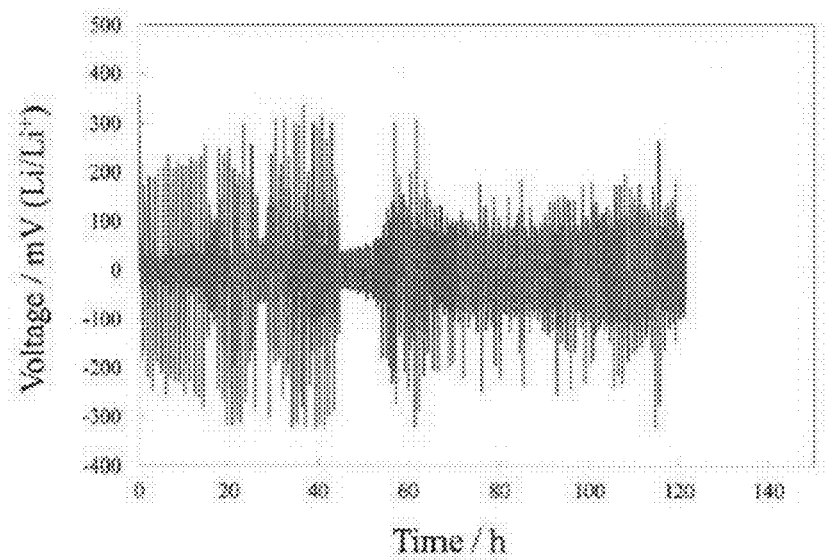
FIG. 17 is a graph showing the time-dependent change of a voltage measured in Example 7.

The voltage-current curve of the coin cell is shown in FIG. 16, and the time-dependent change of a voltage is shown in FIG. 17.

FIG. 16 shows the measured results of a change in a battery voltage when being charged and discharged at a constant temperature and current. It is found that a battery having high charge/discharge reversibility, small polarization, and excellent performance can be manufactured.

FIG. 17 shows the measured results of a voltage when a constant plus current and minus current are alternately applied with a separator sandwiched between two lithium metals. Lithium metal dendrite passing through the separator has been known to cause short circuit to bring about no voltage change. However, it is found that, in the separator of the present Example, a current flows over a long period of time, which suppresses the generation of the dendrite to prevent the short circuit.

Comparative Example 1

3.6 g of calcium carbonate and 5 g of a polyamic acid/dimethylacetamide (PAA/DMAc) solution were put into AWATORIRENTARO (manufactured by THINKY CORPORATION) without performing a surface inactivation treatment, mixed at 2000 rpm for 5 minutes, and then mixed at 2200 rpm for 5 minutes. Hereinafter, a film was formed and peeled in the same manner as in Example 3, to perform a heat treatment for imidizing. However, calcium carbonate reacted with polyamic acid during the heat treatment, which did not provide a film-like form.

Examples 8 to 10

The air permeability and tensile strength of each of polyimide films (separators) obtained in the same manner as in Examples 1 and 3 were measured by the following method.

Air Permeability (Air Permeance Resistivity)

Each polyimide film was cut out to a 5 cm square for use in a sample. A time for which 100 ml of air passed through the sample was measured according to JIS P 8117 using Gurley type densometer (manufactured by Toyo Seiki Kogyo Co., Ltd.). The results are shown in Table 1.

Tensile Strength

Each polyimide film was cut out to a size of 1 cm×5 cm, to obtain a strip sample. The stress (MPa) of the sample when being fractured was evaluated by using RTC-1210A TENSILON (manufactured by ORIENTEC). The results are shown in Table 1.

TABLE 1

| | Surface inactivation treatment | Void ratio (volume ratio of CaCO$_3$) (%) | Polyimide film thickness (μm) | Air permeability (second) | Tensile strength (MPa) |
|---|---|---|---|---|---|
| Example 8 | NMP | 75 | 25 | 232 | 2.3 |
| Example 9 | Silica modification | 75 | 22 | 284 | 5.82 |
| Example 10 | Oxalic acid modification | 75 | 18 | 93 | 2.0 |

It can be estimated that when the film thickness of polyimide is decreased to 5 μm and the void ratio is increased to 90% based on the result of Example 10 having the highest air permeability, the air permeability is 21.5 seconds and the tensile strength is 0.46 MPa. On the contrary, it can be estimated that when the film thickness of polyimide is increased to 100 μm and the void ratio is decreased to 60% based on the result of Example 9 having the lowest air permeability, the air permeability is 1613.6 seconds and the tensile strength is 33.1 MPa.

The invention claimed is:

1. A method for manufacturing a secondary battery separator comprising a porous resin film in which pores have a three-dimensionally ordered structure and are in mutual communication via through-holes, the method comprising:
   uniformly dispersing spherical microparticles having a narrow particle size distribution in a dispersion medium to prepare a spherical microparticles-dispersed slurry;
   drying the spherical microparticles-dispersed slurry to obtain a spherical microparticles-dispersed film;
   heat treating the spherical microparticles-dispersed film to form a spherical microparticles-resin film in which the spherical microparticles are regularly arrayed in three-dimensions in a resin matrix; and
   forming the porous resin film having the pores, which are in mutual communication via through-holes and regularly arrayed in three-dimensions in the resin matrix, the forming comprising
       contacting the spherical microparticles-resin film with an organic acid, water, an alkaline solution or an inorganic acid other than hydrofluoric acid to dissolve and remove the spherical microparticles, to form the pores, or
       heating the spherical microparticles-resin film to remove the microparticles, to form the pores,
   wherein the dispersion medium comprises a resin precursor which constitutes the resin matrix,
   the surfaces of the spherical microparticles are inactive against the dispersion medium, and
   the spherical microparticles are selected from calcium carbonate, calcium oxide, titanium dioxide, cerium oxide, polymethyl methacrylate, polystyrene, and a complex of silica particles, titania particles or ceria particles and carboxymethyl cellulose or polymethyl methacrylate.

2. The method according to claim 1, further comprising:
   inactivating the surfaces of the spherical microparticles against the dispersion medium.

3. The method according to claim 1, wherein the spherical microparticles have a median diameter of 50 nm to 3000 nm and a particle size distribution coefficient of variation of 0 to 70%.

4. The method according to claim 2, wherein the inactivating the spherical microparticle surface comprises dispersing the spherical microparticles in an aprotic polar solvent.

5. The method according to claim 4, wherein the aprotic polar solvent is selected from N-methyl-2-pyrolidone, dimethylformamide, tetramethylurea, and hexamethylphosphoric triamide.

6. The method according to claim 2, wherein the inactivating includes modifying the surfaces of the narrowly disperse spherical microparticles with silicon oxide, titanium oxide, aluminum oxide, zinc oxide, tetraethoxysilane, oxalic acid, citric acid, or lactic acid.

7. The method according to claim 1, wherein the inorganic acid is selected from hydrochloric acid, sulfuric acid, nitric acid, perchloric acid, phosphoric acid, and boric acid.

8. The method according to claim 1, wherein the organic acid is selected from citric acid, acetic acid, formic acid, oxalic acid, lactic acid, and gluconic acid.

9. The method according to claim 1, wherein the alkaline solution is selected from sodium hydroxide, potassium hydroxide, sodium carbonate, potassium carbonate, ammonia, hydroxylamine, ethanol amine, ethylene diamine, phenol, p-cresol, m-cresol, o-cresol, hydroquinone, resorcinol, catechol, and phloroglucinol.

10. The method according to claim 1, wherein the resin matrix is polyimide; and the dispersion medium is polyamic acid.

11. The method according to claim 1, wherein, comprising, to obtain the spherical microparticles-dispersed film:
coating a base, selected from polypropylene, aramid, cellulose, and polytetrafluoroethylene, with the spherical microparticles-dispersed slurry; and
then, drying the base to obtain the spherical microparticles-dispersed film, thereby being a narrowly disperse spherical microparticles-dispersed film having a two-layer structure.

12. The method according to claim 1, comprising, to obtain the spherical microparticles-dispersed film:
coating a film formation substrate with the spherical microparticles-dispersed slurry;
then, drying the film formation substrate to obtain a film; and
then, peeling the film, obtained by the drying the formation substrate, to obtain the spherical microparticles-dispersed film, thereby being a narrowly disperse spherical microparticles-dispersed film having a one-layer structure.

13. A method for manufacturing a lithium secondary battery,
the method comprising positioning the secondary battery separator obtained by the method according to claim 1 between a cathode and an anode.

14. The method according to claim 2, wherein the spherical microparticles have a median diameter of 50 nm to 3000 nm and a particle size distribution coefficient of variation of 0 to 70%.

15. The method according to claim 1, wherein the spherical microparticles are selected from calcium carbonate, polymethyl methacrylate, and polystyrene.

16. A method for manufacturing a secondary battery separator comprising a porous resin film in which pores have a three-dimensionally ordered structure and are in mutual communication via through-holes, the method comprising:
inactivating the surfaces of spherical microparticles against a dispersion medium;
uniformly dispersing the spherical microparticles having a narrow particle size distribution in the dispersion medium to prepare a spherical microparticles-dispersed slurry;
drying the spherical microparticles-dispersed slurry to obtain a spherical microparticles-dispersed film;
heat-treating the spherical microparticles-dispersed film to form a spherical microparticles-resin film in which the spherical microparticles are regularly arrayed in three-dimensions in a resin matrix; and
forming the porous resin film having the pores, which are in mutual communication via through-holes and regularly arrayed in three-dimensions in the resin matrix, the forming comprising
contacting the spherical microparticles-resin film with an organic acid, water, an alkaline solution or an inorganic acid other than hydrofluoric acid to dissolve and remove the spherical microparticles, to form the pores, or
heating the spherical microparticles-resin film to remove the spherical microparticles, to form the pores,
wherein the dispersion medium comprises a resin precursor which constitutes the resin matrix,
the inactivating causes the surfaces of the spherical microparticles to be inactive against the dispersion medium, and
the resin matrix is polyimide and the dispersion medium is polyamic acid.

* * * * *